United States Patent
Kacelenga et al.

(10) Patent No.: US 10,290,294 B1
(45) Date of Patent: May 14, 2019

(54) INFORMATION HANDLING SYSTEM HAVING ACOUSTIC NOISE REDUCTION

(71) Applicant: DELL PRODUCTS, LP, Round Rock, TX (US)

(72) Inventors: Ray V. Kacelenga, Austin, TX (US); Merle J. Wood, III, Round Rock, TX (US); Travis C. North, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/808,323

(22) Filed: Nov. 9, 2017

(51) Int. Cl.
*G10K 11/178* (2006.01)
*G06F 1/3206* (2019.01)

(52) U.S. Cl.
CPC .......... *G10K 11/178* (2013.01); *G06F 1/3206* (2013.01); *G10K 2210/11* (2013.01); *G10K 2210/3031* (2013.01); *G10K 2210/30351* (2013.01)

(58) Field of Classification Search
CPC ............................... G06F 1/324; G06F 1/3293
See application file for complete search history.

(56) References Cited

U.S. PATENT DOCUMENTS

| | | | |
|---|---|---|---|
| 7,567,677 B1 | 7/2009 | Chan et al. | |
| 9,891,883 B2* | 2/2018 | Sharma | G06F 3/165 |
| 2009/0043577 A1* | 2/2009 | Godavarti | G10L 21/02 704/233 |
| 2012/0163622 A1 | 6/2012 | Karthik et al. | |
| 2013/0039497 A1* | 2/2013 | Ramalho | H04R 1/2834 381/56 |
| 2013/0342521 A1* | 12/2013 | Griffiths | H05B 37/0236 345/212 |
| 2015/0066495 A1* | 3/2015 | Zhang | G10L 15/02 704/231 |
| 2015/0073795 A1* | 3/2015 | Tan | G10L 15/063 704/243 |
| 2016/0378427 A1* | 12/2016 | Sharma | G10L 19/018 700/94 |
| 2016/0379456 A1* | 12/2016 | Nongpiur | G08B 13/1672 340/541 |
| 2017/0178681 A1* | 6/2017 | Keal | G10H 1/0033 |
| 2017/0251097 A1* | 8/2017 | Jackson | H04M 1/72569 |

* cited by examiner

*Primary Examiner* — Mohammad K Islam
(74) *Attorney, Agent, or Firm* — Larson Newman, LLP

(57) ABSTRACT

An information handling system includes a processor configured to operate in one of a plurality of power states. An audio circuit measures an ambient audio environment within the information handling system, classifies the measured ambient audio into one of a plurality of categories, and implements a power management policy for the processor in response to the measured ambient audio being classified into the one of the categories.

15 Claims, 4 Drawing Sheets

US 10,290,294 B1

INFORMATION HANDLING SYSTEM HAVING ACOUSTIC NOISE REDUCTION

FIELD OF THE DISCLOSURE

The present disclosure generally relates to information handling systems, and more particularly relates to an information handling system having acoustic noise reduction.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a processor configured to operate in one of a plurality of power states. An audio circuit measures an ambient audio environment within the information handling system, classifies the measured ambient audio into one of a plurality of categories, and implements a power management policy for the processor in response to the measured ambient audio being classified into the one of the categories.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
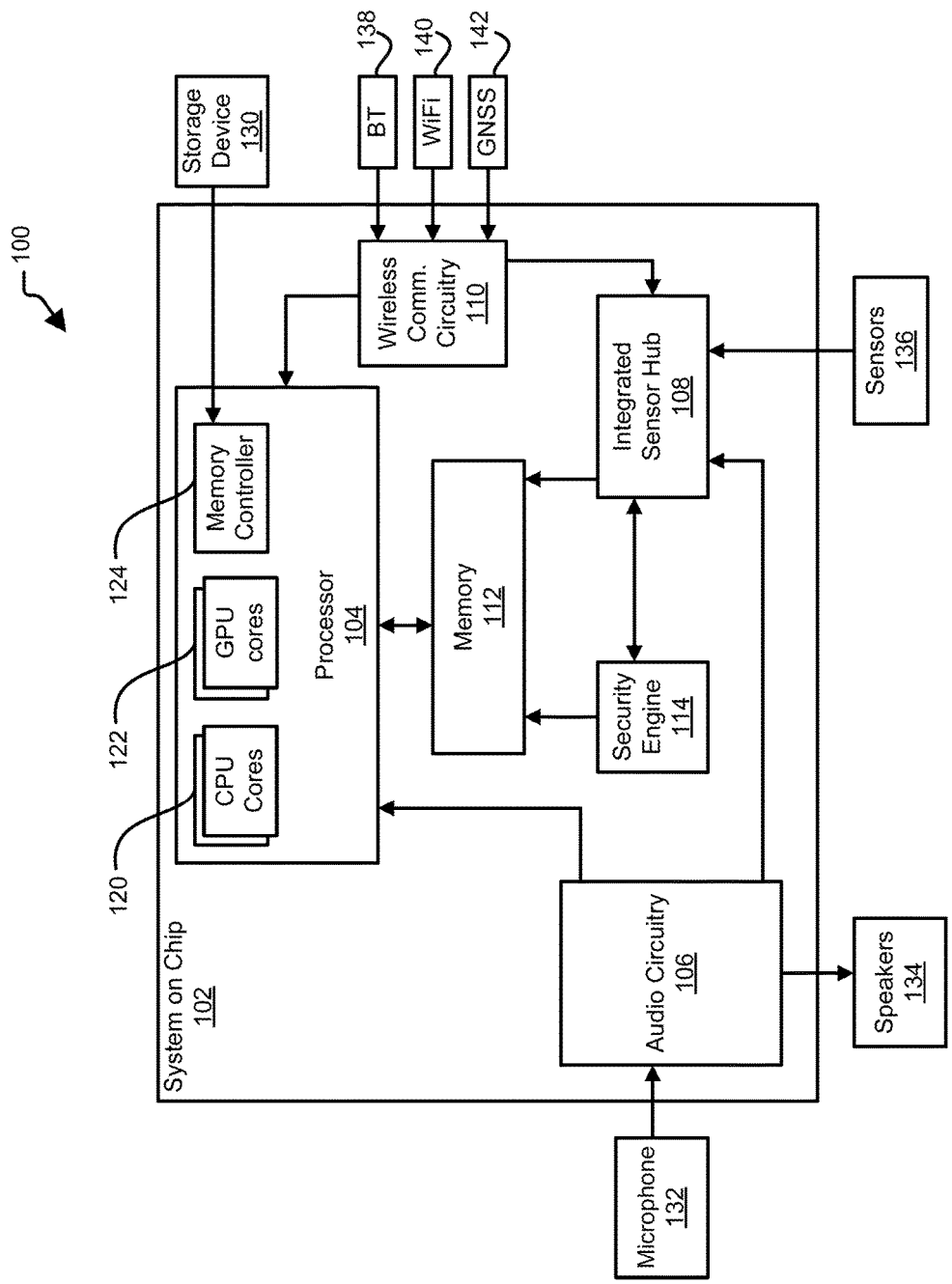
FIG. 1 is a block diagram of an information handling system according to at least one embodiment of the disclosure.

FIG. 1 shows a portion of an information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more buses operable to transmit communications between the various hardware components.

The information handling system 100 includes a system on a chip (SOC) 102, which in turn includes a processor 104, audio circuitry 106, an integrated sensor hub 108, wireless communication circuitry 110, memory 112, and a security engine 114. The processor 104 can be a multiple core processor, such that the processor 104 includes one or more central processing cores 120, one or more graphic processing cores 122, and a memory controller 124.

The processor 104 includes a first terminal coupled to a storage device 130, a second terminal coupled to the wireless communication circuitry 110, and a third terminal coupled to the memory 112, and a fourth terminal coupled to the audio circuitry 106. In an embodiment, the processor 104 can communicate with the storage device 130 via the memory controller 124 and a first terminal of the processor 104. The audio circuitry 106 includes a first terminal coupled to a microphone 132, a second terminal coupled to speakers 134 of the information handling system 100, a third terminal coupled to the integrated sensor hub 108, and a fourth terminal coupled to the processor 104. The integrated sensor hub 108 can include a first terminal coupled to a sensor 136, a second terminal coupled to the wireless communication circuitry 110, a third terminal coupled to the memory 112, a fourth terminal coupled to the security engine 114, and a fifth terminal coupled to the audio circuitry 106. The wireless communication circuitry 110 includes a first terminal coupled to the integrated sensor hub 108, second, third, and fourth terminals each coupled to a different wireless communication devices, such as a Blue Tooth (BT) device 138, a wireless fidelity (WiFi) 140, and a global navigation satellite system (GNSS) 142, and a fifth terminal coupled to the processor 104. The memory 112 includes a first terminal coupled to the processor 104, a second terminal coupled to the security engine 114, and a third terminal coupled to the integrated sensor hub 108. The security engine 114 includes a first terminal coupled to the integrated sensor hub 108, and a second terminal coupled to the memory 112.

During operation of the information handling system 100, the different components within the SOC 102 can perform different functions. As the components start and end these operations, the processor 104 can transition between different power states. For example, the CPU cores 120 may transition from a lowest idle power state (P-states) to a wake up power state, from a sleep power state to the wake up power state, from a running power state to a sleep power state, or the like. During these power state transitions, capacitors within the processor 104 can be charged and discharged. In an embodiment, the capacitors can be ceramic capacitors or the like. The rapid charging and discharging of ceramic capacitors during entry into and exit from various power states can induce an electrostrictive effect that can cause a circuit or motherboard within the information handling system 100 to vibrate. However, the vibration frequency can periodically enter the audio band, such that the vibration can be perceived by users of the information handling system 100. If the sound generated from the vibration of the circuit or motherboard is prolonged, the user experience can be degraded. Thus, a reduction in the number of times that the capacitors are charged and discharged can improve a user experience by reducing sounds produced by the electrostrictive effect of the capacitors.

In an embodiment, the audio circuitry 106 can be any type of digital signal processor, such as a converged Audio, Voice and Speech (cAVS) circuitry that is a low-power audio device with multiple capabilities that include wake-on-voice, keyword detection, and speaker ID, among others. In an embodiment, the audio circuitry 106 can be a low-power audio classifier. However, additional embodiments may be expanded for any processor where an audio classifier may be used to determine adverse acoustic conditions without varying from the scope of this disclosure. In an embodiment, the audio circuitry 106 can monitor audio events within the information handling system 100, via the microphone 132 or any other microphone located within the information handling system 100. The audio circuitry 106 can then classify any detected audio event, and determine whether the audio event is electrostrictive noise. The audio circuitry 106 may also determine a likelihood ratio for classification of the determined audio event, from which a level of confidence can be derived for the classification.

The audio circuitry 106 may include a table, such as Table 1 below, that includes audio categories with a corresponding range of sound pressure level in decibels ($SPL_{dB}$).

TABLE 1

| Audio Classifier Categories | |
| --- | --- |
| Audio Category | SPLdB |
| Motion - rustling | 10-15 |
| Quiet | 20-30 |
| Speech | 40-60 |
| Noisy | 60-70 |
| Mechanical Noise | 90-110 |
| Music | 75-120 |
| Electrostrictive Noise | TBD |

The audio classification table stored in the audio circuitry 106 can be loaded with predefined categories with corresponding sound pressure level ranges, such as motion of the information handling system 100, a quiet category, speech category, noisy category, mechanical noise category, music category, or the like. In an embodiment, some of these categories may have sub-categories, such as speech can have sub-categories of speech-male, speech-female, or the like. Additionally, music can have sub-categories, such as music-rock, music-classical, or the like. The audio circuitry 106 should be trained to classify electrostrictive noise before this category of noise can be identified by the audio circuitry 106 during operation of the SOC 102 within the information handling system 100. In an embodiment, an audio classifier within the audio circuitry 106 can be based on, a Gaussian Mixture Model that is trained offline to recognize a given audio environment, such as one created by circuit board vibrations.

During a training mode, a microphone, such as microphone 132, located within an enclosure of the information handling system can record an ambient environment. During the training mode, environment around the information handling system 100 and the operation of the components within the information handling system 100 can be controlled to ensure that any detected sound pressure level is caused by circuit board vibrations. The SOC 102 can then be placed in different usage scenarios that can cause circuit board vibrations. For example, the wireless communication device 110 can receive and/or transmit a high volume of WiFi traffic, the integrated sensor hub 108 can receive a lot of data from the sensor 136 and can transfer that large amount of data to the processor 104, or the like. Other intensive operations performed by the processor 104 can include loading a large amount of data from a universal serial bus (USB) device, saving a large amount of data to/from a disk drive, or the like. Additionally, the processor 104 can be put through different work cases that can cause the processor 104 to transition from the idle power state to the wake up power state, from the sleep power state to the wake up power state, from running power state to the sleep power state, or any other rapid and large transition between power states.

During these training scenarios that create circuit board vibrations, the microphone 132 can collect the audio data within the enclosure of the information handling system 100. These collected audio data sets can then be used to train the audio classifier in the audio circuitry 106 to recognize the unique audio environment caused by board vibrations. The training of the audio classifier can be done by creating models for the audio data. In an embodiment, the models can be created by performing a Fast Fourier Transform (FFT) of pulse-coded modulation (PCM) data (FFT PCM). Frequency domain FFT data can be augmented with time domain data, such as peak values, rates of change, and the like to create a feature vector that is then used to train the classifier of the audio circuitry 106. In an embodiment, an Audio Firmware Development Kit (FDK) can be utilized to load the new classifier model parameters into the table of the audio circuitry 106. The training mode can end after a classifier recall accuracy of noise categories for the trained model against test data exceeds a predefined level. In an embodiment, the predefined accuracy level can be 97%. In an embodiment, when the training data is collected, part of the data is used to train audio models for the classifier of the audio circuitry 106 and a separate subset of the data is used to test the model for accuracy. The classifier audio model parameters can then be stored in the audio circuitry 106.

During regular operation, the audio circuitry 106 can automatically monitor the ambient audio within the information handling system 100, and can determine whether the audio data of an audio event can be classified into a particular audio category, such as one of the audio categories stored within the table of the audio circuitry. In an embodiment, the audio circuitry 106 can sample the ambient audio a particular interval, such as every millisecond, every second, every minute, or the like. The trained audio models stored within the audio circuitry 106 can then determine whether the audio category is the electrostrictive category, such that the audio event is a result of circuit board vibrations caused by the capacitive electrostrictive effects during C-state changes of the processor 104.

Different applications within the processor 104, such a power management applications, can subscribe for notifications from the audio circuitry 106. In an embodiment, notifications can include identifying a change in an audio event category, identification of the new audio category, or the like. In an embodiment, a payload of the notification data can also consist of likelihood values for each audio class/category of the audio event from which a confidence value can be inferred. The processor 104 can utilize the confidence value for each category, and in particular for the electrostrictive noise category, to determine when audio noise suppression policies should be enforced. For example, if the confidence value for the electrostrictive category is high, then the processor 104 can determine that power policies and other audio noise suppression policies should be enforced to reduce the electrostrictive noise generated by the charging and discharging of the capacitors during power state changes.

In an embodiment, the power policies can include reducing the operations of the wireless communication circuitry 110, provide interrupts to the integrated sensor hub 108 to reduce the amount of data provided to the processor 104, or the like. In an embodiment, the power policies can be any policy that reduces power state changes in the processor 104, such that the rapid charging and discharging of the capacitor is reduced, which in turn reduces the electrostrictive noise generated by vibrations in the circuit board and mother board of the information handling system 100.

Figure 2:
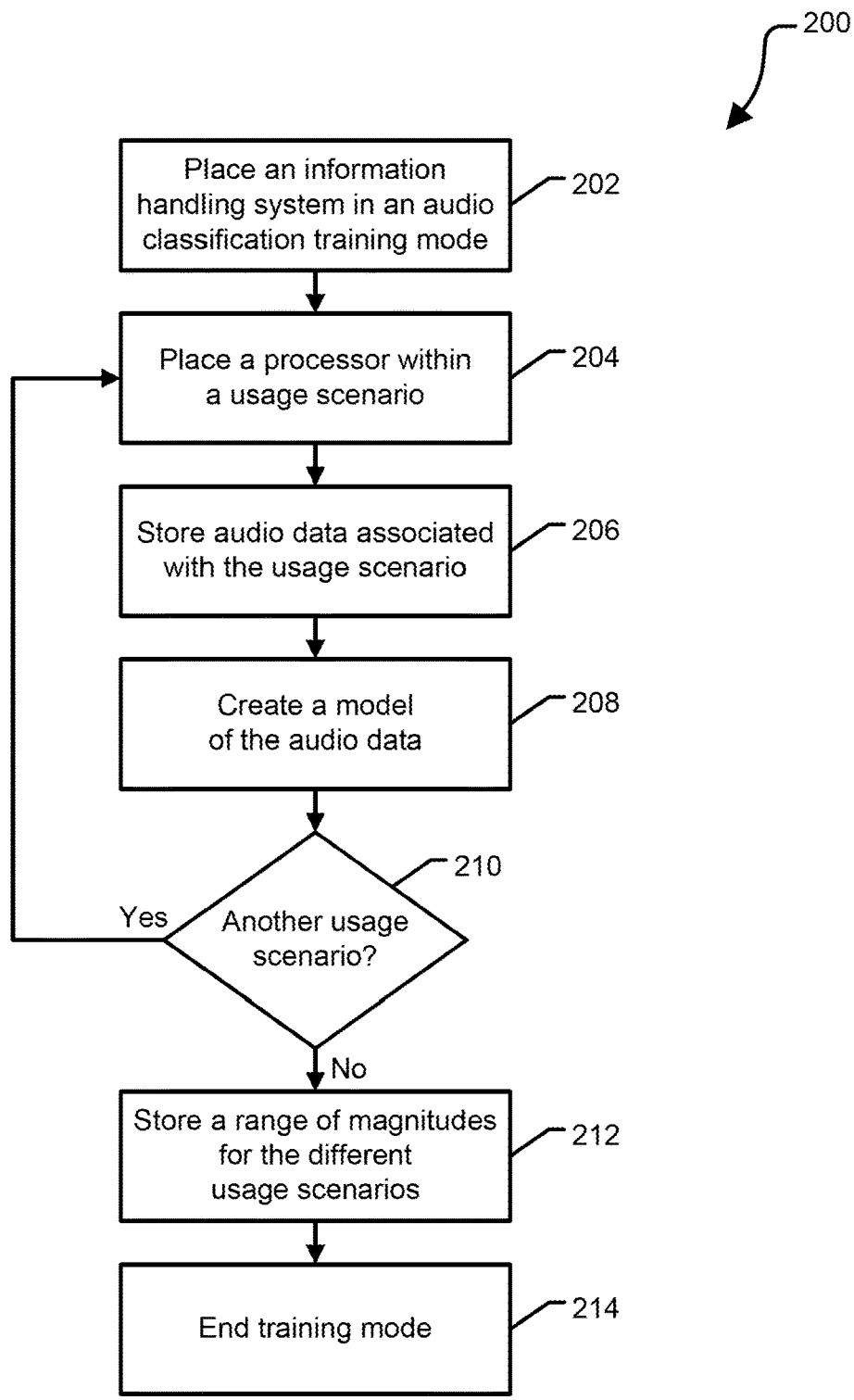
FIG. 2 is a flow diagram of a method for training audio circuitry to detect electrostrictive noise according to at least one embodiment of the present disclosure.

FIG. 2 is a flow diagram of a method 200 for training audio circuitry to detect electrostrictive noise according to at least one embodiment of the present disclosure. At block 202, an information handling system is placed within an audio classification training mode. A processor of the information handling system is placed into a usage scenario at block 204. In an embodiment, the usage scenario is any set of operations that cause power state changes within the processor, which in turn can cause capacitors of the processor to rapid charge or discharge. At block 206, the audio circuitry can store the audio data associated with the usage scenario.

At block 208, a model of the audio data is created. In an embodiment, the models can be created by performing FFT PCM of the audio data and the magnitude of points within the FFT PCM can be analyzed. A determination is made whether another usage scenario exists at block 210. If another usage scenario exists, the flow continues as stated above at block 204. Otherwise, a range of magnitudes for the different usage scenarios are stored at block 212. In an embodiment, the range of magnitudes can be stored in an audio classifier table of the audio circuitry. At block 214, the training mode is ended.

Figure 3:
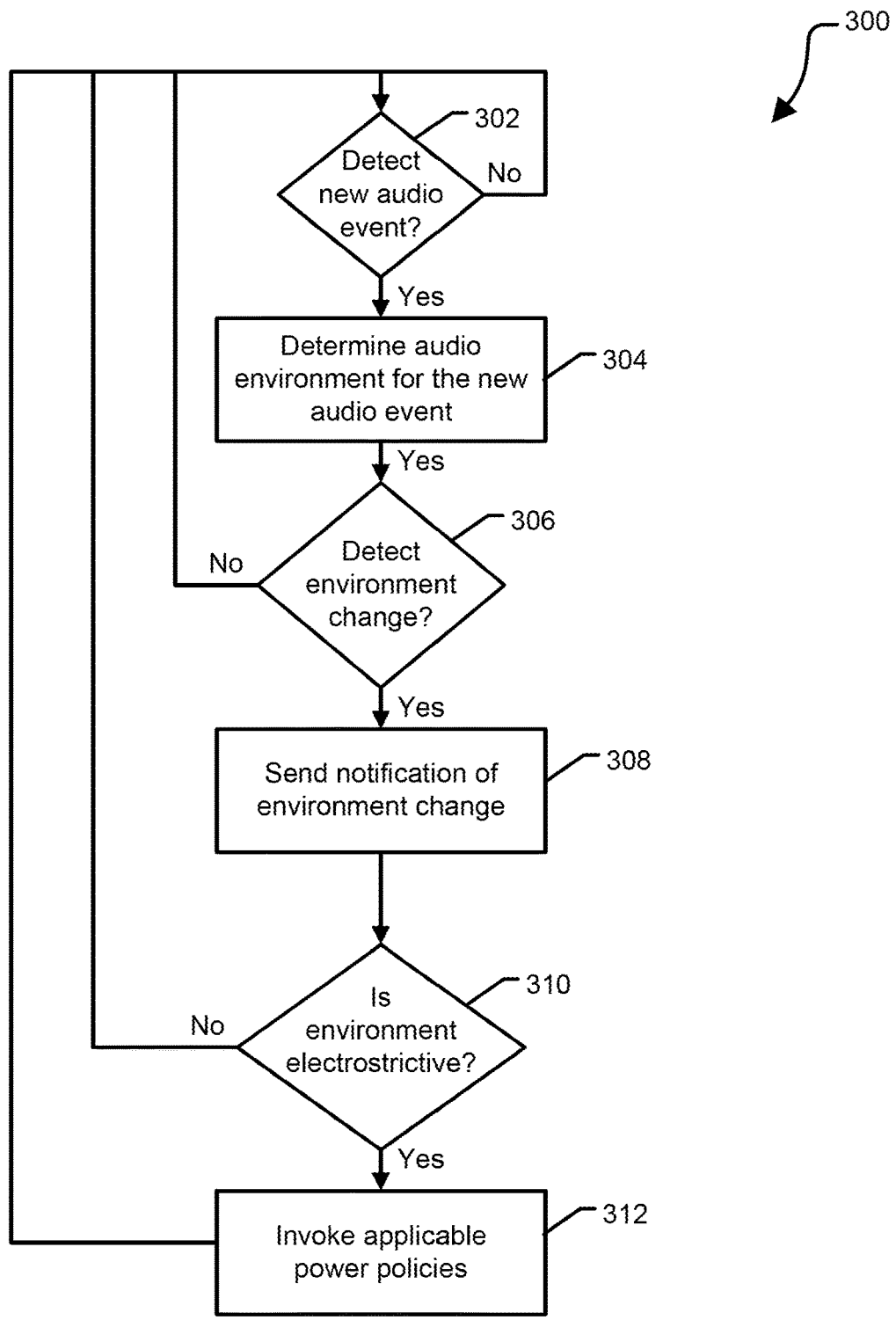
FIG. 3 is a flow diagram of a method for monitoring audio events according to at least one embodiment of the disclosure.

FIG. 3 is a flow diagram of a method 300 for monitoring audio events according to at least one embodiment of the disclosure. At block 302, a determination is made whether a new audio event is detected. In an embodiment, the audio event can be audio data collected by a microphone within an information handling system and sent to audio circuitry for analysis. An audio environment or category for the audio event can be determined at block 304. In an embodiment, a Sound Pressure Level (SPL) above a prescribed threshold can be used to start logging of the audio data and then running the classifier to determine a prevailing category for the measured noise of the audio event. In an embodiment, the audio category can be determined by the trained audio models, within the classifier of the audio circuitry, detecting an active noise category for a measured noise of the audio event.

In an embodiment, the audio environment can be within a quiet category, within a speech category, within a noisy category, within a music category, within a mechanical noise category, within an electrostrictive noise category, or the like. At block 306, a determination is made whether the audio environment has changed.

If the audio environment has not changed, the flow continues as described above at block 302. Otherwise, if the audio environment has changed, a notification of the audio category is sent to a processor of the information handling system at block 308. At block 310, a determination is made whether the audio environment is within an electrostrictive category. If the audio environment is not within the electrostrictive category, the flow continues as described above at block 302. Otherwise, if the audio environment is within the electrostrictive category, applicable power policies, such as those described above, are invoked in the processor at block 312, and the flow then continues at block 302.

Figure 4:
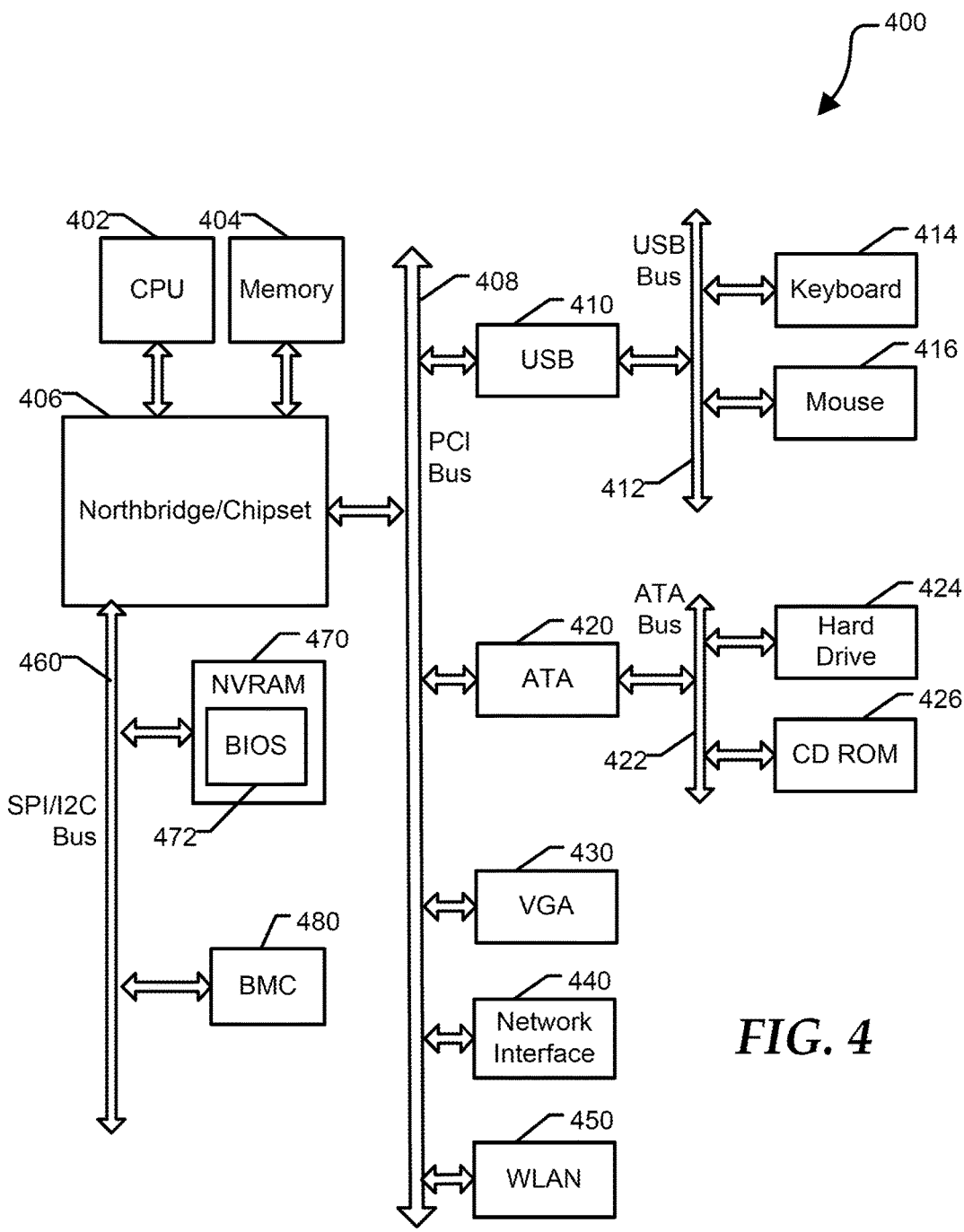
FIG. 4 is a block diagram of a general information handling system according to an embodiment of the present disclosure.

FIG. 4 illustrates a general information handling system 400 including a processor 402, a memory 404, a northbridge/chipset 406, a PCI bus 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as CPU 402, a programmable logic array (PLA), an embedded device such as a System-on-a-Chip (SoC), or other control logic hardware. Information handling system 400 can also include one or more computer-readable medium for storing machine-executable code, such as software or data.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of northbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor configured to operate in one of a plurality of power states; and
   audio circuitry to receive a measured ambient audio data within the information handling system, to classify the measured ambient audio data into one of a plurality of categories, and to implement a power management policy for the processor in response to the measured ambient audio being classified into the one of the categories,
   wherein during a training mode, the audio circuitry to store audio data within the information handling system during usage scenarios of the processor that create circuit board vibrations within the information handling system, to create an audio model based on the stored audio data, and to store the audio model for the one of the categories.

2. The information handling system of claim 1, the audio circuitry to derive a confidence level with respect to the measured ambient audio data being classified within the one of the categories.

3. The information handling system of claim 1, further comprising:
   a microphone to communicate with the audio circuitry, the microphone being located near a circuit board within the information handling system.

4. The information handling system of claim 3, wherein a frequency of vibration of the circuit board from ceramic capacitors on the circuit board being charged and discharged causes the ambient audio environment to be within an electrostrictive noise category of the categories.

5. The information handling system of claim 1, the audio circuitry to determine if the classified category has changed, and to provide a notification to the processor in response to the change in the classified category.

6. The information handling system of claim 1, wherein the ambient audio data is measured at a predetermined interval.

7. A method comprising:
   receiving, at audio circuitry of an information handling system, measured ambient audio data within the information handling system;
   classifying, by the audio circuitry, the measured ambient audio data into one of a plurality of categories;
   implementing a power management policy for a processor of the information handling system in response to the measured ambient audio being classified into the one of the categories;
   placing the audio circuitry in a training mode; and
   during the training mode, storing audio data within the information handling system during different usage scenarios of the processor;
   creating an audio model based on the stored audio data; and
   storing the audio model for the one of the categories,
   wherein each of the different usage scenarios create circuit board vibrations within the information handling system.

8. The method of claim 7, wherein a frequency of vibration of the circuit board from ceramic capacitors on the circuit board being charged and discharged causes the ambient audio environment to be within an electrostrictive noise category of the categories.

9. The method of claim 7, further comprising:
   deriving a confidence level with respect to the classifying of the measured ambient audio data within the one of the categories.

10. The method of claim 7, further comprising:
    determining if the classified category has changed; and
    providing a notification to the processor in response to the change in the classified category.

11. The method of claim 7, wherein the ambient audio data is measured at a predetermined interval.

12. A method comprising:
    receiving, at audio circuitry of an information handling system, measured ambient audio data within an enclosure of the information handling system;
    comparing the measured ambient audio data to audio data stored within an audio classification table, wherein the stored audio data corresponds to a plurality of audio categories;
    classifying, by trained audio models within the audio circuitry, the measured ambient audio data into one of the categories based on the measured ambient audio data matching audio trained classifier models stored for the one of the categories;
    implementing a power management policy for a processor of the information handling system in response to the measured ambient audio being classified into the one of the categories;
    placing the audio circuitry in a training mode; and
    during the training mode:
      storing audio data within the information handling system during different usage scenarios of the processor;
      creating an audio model based on the stored audio data; and
      storing the audio model for the one of the categories,
    wherein each of the different usage scenarios create circuit board vibrations within the information handling system.

13. The method of claim 12, wherein a frequency of vibration of the circuit board from ceramic capacitors on the circuit board being charged and discharged causes the ambient audio environment to be within an electrostrictive noise category of the categories.

14. The method of claim 12, further comprising:
deriving a confidence level with respect to the classifying of the measured ambient audio data within the one of the categories.

15. The method of claim 12, further comprising:
determining if the classified category has changed; and
providing a notification to the processor in response to the change in the classified category.

\* \* \* \* \*